United States Patent
Longo et al.

(10) Patent No.: US 8,205,417 B2
(45) Date of Patent: Jun. 26, 2012

(54) HEAT-RESISTANT FOAMED POLYESTER ARTICLES AND PROCESS FOR THEIR MANUFACTURE

(75) Inventors: Eugenio Longo, Rho (IT); Andrea Paci, Milan (IT)

(73) Assignee: Cryovac, Inc., Duncan, SC (US)

( * ) Notice: Subject to any disclaimer, the term of this patent is extended or adjusted under 35 U.S.C. 154(b) by 505 days.

(21) Appl. No.: 12/311,649

(22) PCT Filed: Sep. 19, 2007

(86) PCT No.: PCT/EP2007/059881
§ 371 (c)(1),
(2), (4) Date: Apr. 7, 2009

(87) PCT Pub. No.: WO2008/043646
PCT Pub. Date: Apr. 17, 2008

(65) Prior Publication Data
US 2010/0003378 A1    Jan. 7, 2010

(30) Foreign Application Priority Data

Oct. 13, 2006    (EP) .................................... 06122276

(51) Int. Cl.
    *B65B 3/02*    (2006.01)
(52) U.S. Cl. .......................................... 53/452; 53/558
(58) Field of Classification Search ............... 53/452, 53/459, 558, 133.1, 570, 133.2, 249
    See application file for complete search history.

(56) References Cited

U.S. PATENT DOCUMENTS

| | | | |
|---|---|---|---|
| 4,462,947 A | 7/1984 | Huggard | |
| 4,582,665 A * | 4/1986 | Jabarin | ........................ 264/544 |
| 4,981,631 A | 1/1991 | Cheung et al. | |
| 5,000,991 A | 3/1991 | Hayashi et al. | |
| 5,618,486 A | 4/1997 | Yoshimi et al. | |
| 5,788,910 A * | 8/1998 | McNelis et al. | ............... 264/296 |
| 5,985,190 A | 11/1999 | Harfmann | |
| 6,273,697 B1 | 8/2001 | Harfmann | |
| 2006/0230708 A1 | 10/2006 | Granili | |

FOREIGN PATENT DOCUMENTS

| | | |
|---|---|---|
| EP | 0 115 162 A2 | 8/1984 |
| EP | 0 372 846 A2 | 6/1990 |
| EP | 0 390 723 A2 | 10/1990 |
| EP | 1 325 869 | 7/2003 |
| EP | 1 528 079 | 5/2005 |
| WO | WO 99/55513 A | 11/1999 |
| WO | WO 2004/074106 A | 9/2004 |

* cited by examiner

*Primary Examiner* — Sameh H. Tawfik
(74) *Attorney, Agent, or Firm* — Daniel B. Ruble

(57) ABSTRACT

The present invention relates to a process for thermoforming a foamed polyester sheet of low crystallinity to produce a heat-resistant molded foam article (13). The process comprises the steps of heating a foamed polyester sheet (10) to a preforming temperature by contact with at least one heating plate and molding the heated foamed polyester sheet onto a non-heated mold (30). The present invention further relates to a process for manufacturing a package by thermoforming a foamed polyester sheet of low crystallinity to produce a heat-resistant molded foam container, loading a product (51) into said container and sealing or welding a film of thermoplastic material (61) onto said container to close it.

The heat-resistant molded foam articles and the packages thus obtained are excellent in heat resistance and are not thermally distorted even when heated in a microwave or conventional oven. They are particularly useful for the packaging of food products for dual ovenable applications.

10 Claims, 3 Drawing Sheets

HEAT-RESISTANT FOAMED POLYESTER ARTICLES AND PROCESS FOR THEIR MANUFACTURE

The present invention relates to a process for manufacturing a heat-resistant molded foam article by thermoforming a foamed polyester sheet, and more particularly to a process for thermoforming a foamed polyester sheet of low crystallinity to produce a heat-resistant molded foam article particularly useful for a food container which is not thermally distorted even when heated in a microwave or conventional oven.

The present invention further relates to a process for manufacturing a package that can be heated in a microwave or conventional oven by thermoforming a foamed polyester sheet of low crystallinity to produce a heat-resistant molded foam container, loading a product into said container and sealing or welding a film of thermoplastic material onto said container to close it.

BACKGROUND ART

Packaging systems comprising a rigid heat stable container having a thin flexible thermoplastic film sealed onto it are commonly used for the packaging of so-called "ready-meals", that is meals that require only heating to be ready for consumption. Heating can be carried out either in a microwave or in a conventional oven. Due to the temperatures involved in the heating step only few materials can be used. Crystalline polyethylene terephthalate (CPET) containers are especially suitable for this application, where it is required to reheat the contents to high temperatures, typically in the order of 175° C. to 200° C. Whereas amorphous polyethylene terephthalate, i.e. a material which has a low degree of crystallinity, typically about 5 to 10%, becomes dimensionally unstable at approximately 70° C., CPET, which has a degree of crystallinity above 20%, remains dimensionally stable up to about 200° C. and above.

Containers made of a foamed material have some advantages over non-foamed ones in particular when ovenable applications are contemplated. Firstly, the foamed material has better heat insulating properties which allow manual handling of the packaged food product after heating in the oven. Secondly, as the density of the foamed material is lower, the amount of polymer resin needed to produce an article with a specific thickness and/or mechanical resistance is reduced. Thus, foamed CPET molded articles offer significant advantages as containers for food products which require heating in microwave or conventional ovens, i.e. containers for so-called "dual ovenable" applications.

Thermoforming is a process which is used commercially in the production of polyester articles. It is a particularly valuable technique for producing thin walled articles, such as dual ovenable food containers. However, it is well known in the art that polyester containers obtained by thermoforming sheets of high crystallinity are not heat stable, rather they warp and distort when heated in an oven.

Known methods to produce heat-resistant molded polyester foam products involve thermoforming a foamed polyester sheet of low crystallinity to produce a molded foam product whose degree of crystallinity is increased during the thermoforming process by molding the sheet with a heated molding die held at high temperature, and by continuously heating the polyester sheet inside the mold to induce crystallisation. The molded article is generally heat treated in the mold in order to attain a crystallinity of at least about 20%.

For instance, EP-A-115,162 discloses a method wherein a sheet of foamed polyester having a crystallinity in the range of from 0% to 18% is heated to a temperature between the glass transition and the melting temperature of the polyester resin; contacted with a heated mold which is held at a temperature which is preferably higher than the temperature of the sheet; the sheet is maintained in the heated mold until the average crystallinity is at least 20% and it is then removed from the mold.

EP-A-390,723 discloses a similar method wherein a substantially amorphous foamed polyester sheet is preheated above its glass transition temperature until is softens; it is drawn into a heated mold; heat-set by keeping the molded sheet in contact with the heated mold for a sufficient time to crystallise the sheet to a level of crystallinity of at least 15%.

U.S. Pat. No. 5,618,486 discloses a method for thermoforming foamed polyester sheets into heat-resistant containers wherein the low crystallinity sheet is preheated so that its surface temperature is between 110-150° C.; the preheated sheet is molded in a mold held at a temperature between 150° and 200° C. and held in said mold until the average crystallinity is at least 20%; the molded sheet is then advanced to and held in a cooling mold until it reaches a temperature of about 70° C.

The known methods for thermoforming heat-resistant foamed polyester articles require the use of a heated mold which is held at a temperature generally higher than the temperature of the foamed polyester sheet when it enters the mold. During the molding process heat is transferred from the heated mold to the foamed polyester sheet to increase its degree of crystallinity. The heat transfer occurs either during the thermoforming step or in a subsequent "heat-setting" step which takes place in a second mold.

It has now been found that it is possible to thermoform a foamed polyester sheet of low crystallinity to produce a molded foam article with a high degree of crystallinity, i.e. above 20%, without the need to provide heat to the polyester foam sheet during the thermoforming step or in a subsequent "heat-setting" step taking place in a second mold. In particular it has now been found that it is possible to thermoform a foamed polyester sheet of low crystallinity into a molded foam article with a degree of crystallinity above 20% by heating the foamed polyester sheet to a suitable preforming temperature and forming said sheet in a non-heated mold. The mold is at a temperature which is lower than the preforming temperature of the polyester sheet.

Thus a first object of the present invention is a process for thermoforming a foamed polyester sheet of low crystallinity into a heat-resistant molded foam article comprising the steps of: heating the foamed polyester sheet to a preforming temperature by contact with at least one heating plate; forming the heated foamed polyester sheet onto a non-heated mold; and releasing the molded foamed polyester sheet from the mold.

A second object of the present invention is a heat-resistant molded foam article obtainable with the process according to the first object.

The process of the present invention has the advantage that shorter cycle times and/or less bulky thermoforming equipment are required for the manufacture of heat-resistant foamed polyester molded products. Thus, as the container thermoforming section can be more compact, it is more convenient to integrate the container thermoforming step with a product packaging step and to carry out the whole process in-line on a single machine.

Thus a third object of the present invention is a packaging process comprising the steps of heating a foamed polyester sheet of low crystallinity to a preforming temperature by contact with at least one heating plate; forming the heated foamed polyester sheet onto a non-heated mold; releasing the heat-resistant molded foamed polyester sheet from the mold; loading a product into said heat-resistant molded foamed polyester sheet; bringing a film of thermoplastic material over said product and said heat-resistant molded foamed polyester sheet and sealing or welding said film of thermoplastic material onto said heat-resistant molded foamed polyester sheet.

A fourth object of the present invention is a package comprising a heat-resistant polyester molded foam article, a product loaded therein and a film of thermoplastic material placed over the product and the molded foam article and sealed or welded onto the molded foam article.

The heat-resistant molded foam articles and the packages of the present invention are particularly suitable for the packaging of food products for dual ovenable applications.

BRIEF DESCRIPTION OF THE DRAWINGS

Further details and advantages of the invention will be apparent from the following description with reference to the annexed drawings, wherein.

The same reference numbers will be used through the following description for indicating the same or functionally equivalent parts.

DETAILED DESCRIPTION

As used herein the term "heat-resistant product" refers to a product which is not thermally distorted when heated to a temperature of at least 200° C. in a microwave or conventional oven.

As used herein the term "low crystallinity" refers to a degree of crystallinity of less than 18%.

As used herein the term "high crystallinity" refers to a degree of crystallinity of at least 18%.

Figure 1:
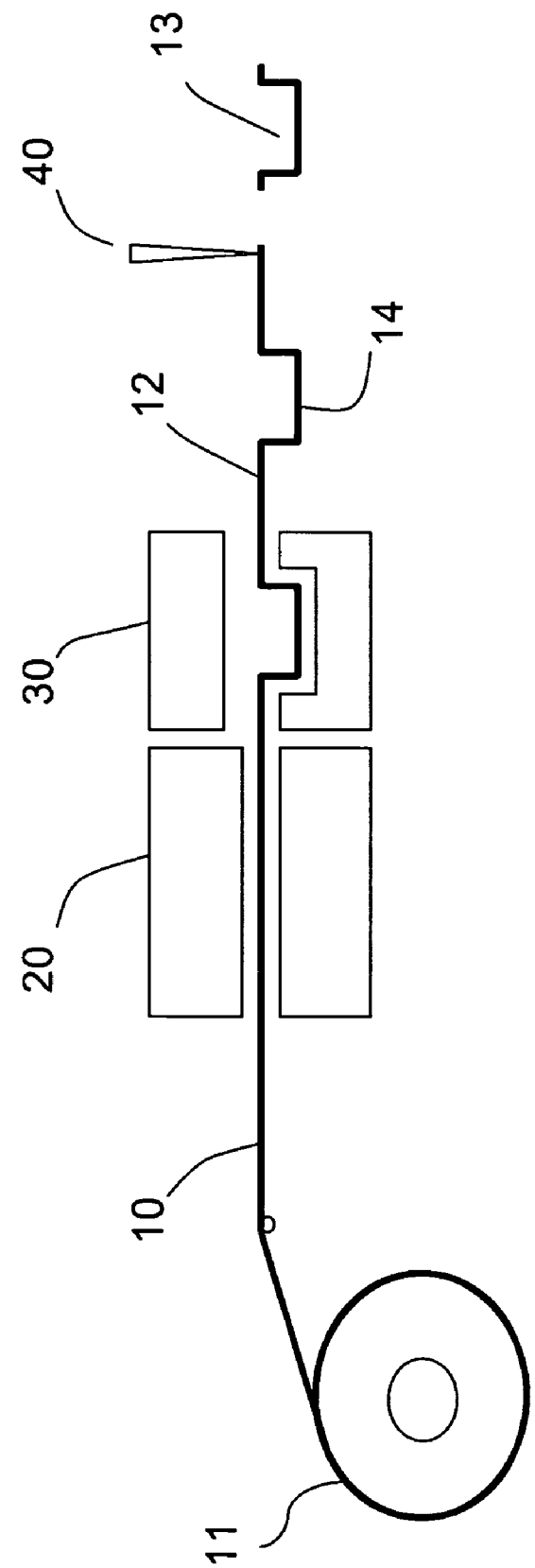
FIG. 1 is a schematic representation of a process for thermoforming a foamed polyester sheet according to one embodiment of the present invention.

FIG. 1 schematically shows the process for thermoforming a foamed polyester sheet 10 of low crystallinity according to a first embodiment of the present invention. In FIG. 1, foamed polyester sheet 10 is fed from a roll of foam sheet 11 and advanced to a heating station 20. The sheet is advanced by means of chain clamps, roll clamps, or the like, disposed on both ends of the sheet (not shown).

In an alternative embodiment foamed polyester sheet 10 could be fed directly from an extruder. A tubular foamed sheet extruded from an extruder could be cut with a blade along the extruding direction, pulled open to form a sheet and fed to the heating station 20 as a sheet 10.

In the heating station 20, the sheet is heated to a preforming temperature, which is defined as the sheet surface temperature at the exit of the heating station. The preforming temperature is at least 140° C., at least 150° C., at least 160° C., at least 170° C., at least 180° C., at least 190° C., at least 200° C. The preforming temperature is less than 255° C., less than 250° C. The preforming temperature is in the range of from 140 to 250° C., from 180 to 245° C., from 190 to 235° C., from 200 to 235° C. The sheet surface temperature could be measured for instance with an infrared non-contact thermometer. When the surface temperature of the sheet 10 is lower than 140° C., the sheet cannot satisfactorily be molded. When the surface temperature of the sheet is higher than 255° C. the sheet softens and sags excessively preventing an effective molding process.

Several means are known for heating sheets in thermoforming operations such as radiant heating, IR heating, convection heating, and the like. In the process of the present invention foamed polyester sheet 10 is heated by conduction heating through contact of the sheet with at least one heating plate. Contact with a heating plate has been found to provide the fastest method of heating foamed polyester sheet 10 in the shortest space. The heating plate may be positioned above or, preferably, below the sheet. Typically two heating plates are present in heating station 20: one above and one below foamed polyester sheet 10. When two heating plates are present, foamed sheet 10 is in contact with at least the lower plate, i.e. the one positioned below the sheet. In this configuration the plate does not only provide heating to the sheet but also support, preventing sagging and deformation of the sheet.

The temperature of heating station 20 is adjusted to heat the foamed polyester sheet to the desired preforming temperature and it depends on several parameters, e.g. the forming cycle time.

Optionally a second heating station, for instance in the form of a second set of heating plates, can be present. The preforming temperature in this case being defined as the surface temperature of the sheet at the exit of the second heating station.

In a subsequent step the heated sheet 10 is molded in a non-heated molding die 30.

As used herein the term "thermoforming" is intended to include: vacuum forming by which a preheated softened sheet is disposed on a molding portion having the shape of a desired product, the air present in the gap between the molding portion of the molding die and the sheet is eliminated by pulling vacuum so that the sheet conforms to the contours of the mold; air pressure assist molding in which there are jointly used vacuum forming and pressure forming in which a sheet is contacted with the molding portions by compressed air at a pressure which is not less than atmospheric pressure; match mold assist forming in which a plug matching the internal shape of the mold is used to guide the deformation of the sheet. Vacuum forming is the preferred thermoforming method.

Molding die 30 is not provided with heating. In particular, molding die 30 is provided with cooling. Molding die 30 can be cooled by mounting the portion of the mold in direct contact with heated sheet 10 on a water cooled plate or base. Alternatively molding die 30 can be provided with internal water cooling. Cooling of the molding die, either by means of a cool contact plate or internal in the mold, ensures that the temperature of molding die 30 never reaches the temperature of the heated polyester sheet.

Molding die 30 can be at any temperature provided it is lower than the preforming temperature of the foamed polyester sheet. Typical temperatures of molding die 30 range from 20 to 130° C., from 30 to 110° C., from 40 to 100° C.

Due to the fact that no transfer of heat from the mold to the foamed polyester sheet takes place to promote an increase in the crystallinity of the sheet itself, the molding time can be shorter than in the prior art molding methods.

Molding cycle times can be as short as 1 second. Typical molding cycle times range from 1, 2, 3, 4 seconds to 6, 7, 8, 9, 10 seconds, preferably from 2 to 9 seconds, from 3 to 7 seconds. Molding cycle times of more than 10 seconds will give acceptable results in terms of quality and heat resistance of the molded foam product, however they would be economically not viable.

The surface temperature of the molded foamed polyester sheet at the exit of the molding station 30 is in the range of 50 to 120° C., of 60 to 100° C.

The degree of crystallinity of the molded portion of molded sheet 12 at the exit of molding station 30 is greater than 20%, 22%, 23%, even greater than 24%. Molded sheet 12 requires no further treatment or "heat-setting" step in a second mold to provide for a heat-resistant molded foam article.

In the embodiment of the process of the invention shown in FIG. 1 a cutting station 40 is positioned downstream of molding station 30. In cutting station 40 the molded sheet 12 is cut transversely and/or longitudinally to give individual molded articles 13. Generally more than one article is molded from sheet 10 at any one time so that molded sheet 12 has to be cut both longitudinally and transversely. Any cutting means common in the art may be used like knives, cutting frames, punch presses, lasers and the like.

The process of the invention is however not limited to the thermoforming of continuous sheets, for instance individual blanks of foamed polyester material could be fed one at the time to the process.

The foamed polyester sheet 10 used in the present invention has a low crystallinity, that is an average crystallinity of less than 18%. Typically, foamed polyester sheet 10 has an average crystallinity in the range of from 1 to 15%, from 1 to 12%, from 5 to 10%.

To obtain such a foamed polyester resin sheet of low crystallinity, the polyester resin once foamed is subjected to rapid cooling using a cooling roll, water cooling or the like.

The foamed polyester resin sheet 10 has a density of from 1.0 to 0.1 $g/cm^3$, from 0.8 to 0.1 $g/cm^3$. The density is preferably not greater than 0.5 $g/cm^3$.

The foamed polyester sheet 10 has a thickness in the range of 0.2 to 5 mm, preferably in the range of 0.3 to 4 mm, even more preferably in the range of 0.5 to 3 mm. If the sheet thickness is thinner than 0.2 mm, the molded product is liable to be insufficient in strength.

The foamed polyester sheet 10 used in the present invention is obtained by foaming a thermoplastic polyester resin. Preference is given to polyester resins which contain ethylene units and include, based on the dicarboxylate units, at least 50 mol. % of terephthalate units. The remaining monomer units are selected from other dicarboxylic acids or diols. Suitable other aromatic dicarboxylic acids are preferably isophthalic acid, phthalic acid, 2,5-, 2,6- or 2,7-naphthalenedicarboxylic acid. Of the cycloaliphatic dicarboxylic acids, mention should be made of cyclohexanedicarboxylic acids (in particular cyclohexane-1,4-dicarboxylic acid). Of the aliphatic dicarboxylic acids, the ($C_3$-$C_{19}$) alkanedioic acids are particularly suitable, in particular succinic acid, sebacic acid, adipic acid, azelaic acid, suberic acid or pimelic acid.

Suitable other aliphatic diols are, for example aliphatic diols such as ethylene glycol, diethylene glycol, triethylene glycol, propylene glycol, 1,3-butane diol, 1,4-butane diol, 1,5-pentane diol, 2,2-dimethyl-1,3-propane diol, neopentyl glycol and 1,6-hexane diol, and cycloaliphatic diols such as 1,4-cyclohexanedimethanol and 1,4-cyclohexane diol, optionally heteroatom-containing diols having one or more rings. Mixtures or blends of homo- and/or co-polyesters can also be used.

Specific examples of the thermoplastic polyester resins include polyethylene terephthalate, polybutylene terephthalate, polycyclohexane terephthalate and the like. Other suitable polyester resins include poly(lactic acid) polymers. Preferably the polyester resin is polyethylene terephthalate.

Suitable polyester resins for the production of foamed polyester sheet 10 have an intrinsic viscosity (IV) greater than 0.7 dl/g, greater than 0.85 dl/g, greater than 1.0 dl/g.

Generally it is possible to use polyester resin recycled from the molding process, like skeletal forming waste, as part of the polyester resin used in the manufacture of the foamed polyester sheet 10. The recycled polyester resin is used in combination with "virgin" resin forming about 20-50% by weight of the total polyester component.

Nucleating agents, chain branching agents, viscosity modifiers, impact modifiers, fillers, pigments and the like may be added to the polyester resin to improve its properties.

Any of the known blowing agents can be used in the production of the foamed polyester sheet of the present invention, both physical, like gases and easy vaporizable liquids, and chemical blowing agents. Suitable physical blowing agents are inert gases, saturated aliphatic hydrocarbons, halogenated hydrocarbons, and the like. Examples of these blowing agents include carbon dioxide, nitrogen, methane, ethane, propane, butane, pentane, hexane. Carbon dioxide and nitrogen are preferred due to their low flammability.

Foamed polyester sheet 10 can have more than one layer, for instance a non-foamed thermoplastic film may be bonded to the foamed polyester sheet on one or on both sides. When the heat-resistant molded foam article is used for the packaging of food products the thermoplastic film is typically bonded to the side of the foamed polyester sheet that will form the food contact side of the container, providing a continuous non-foamed surface which may prevent any leakage of fluid contents through the container. Furthermore the thermoplastic film may facilitate sealing a thermoplastic cover with low compatibility with the polyester resin onto the article or provide the final container with improved gas barrier properties.

The thermoplastic film may be a monolayer or a multilayer film. The thermoplastic film may have a thickness in the range of 4 to 100 microns, from 4 to 50 microns, from 5 to 30 microns.

The thermoplastic film may be selected from a wide variety of oriented and non-oriented films of homo-polymers, co-polymers, and mixtures thereof. Examples of such polymers include polyesters such as polyethylene terephthalate, glycol-modified polyethylene terephthalate (PETG), polyolefins, polyamides, ethylene-vinyl alcohol copolymer and the like.

Particularly advantageous is the use of a monolayer film of a polyester resin compatible with the one used for the foamed sheet so that the composite sheet can be easily recycled into the foamed sheet.

Bonding of the thermoplastic film with the foamed polyester sheet can be carried out by any technique conventionally used in the art, including: coextrusion using a plurality of extruders; in-line lamination; heat- or glue-off-line lamination. Coextrusion of a thermoplastic film of amorphous polyester with the foamed polyester sheet is preferred.

Molded foam articles 13 obtained with the process of the present invention have a degree of crystallinity greater than 20%, 22,%, 23% even greater than 24%.

The density of molded foam articles 13 is typically in the range of 0.2 to 0.8 $g/cm^3$, from 0.2 to 0.75 $g/cm^3$.

The heat resistance of the molded foam articles is determined in terms of distortion of the molded article when heated in a conventional convection oven. In general a suitable testing condition is heating in a convection oven to a temperature of 200° C. for 5 minutes. When the distortion of the molded foam article is lower than 10% in each direction, preferably lower than 8% in each direction, the heat resistance and dimensional stability required for a molded product, such as a container for dual ovenable applications, are satisfied.

Thus, molded foam articles 13 obtained with the process of the present invention have a distortion in each direction of less than 10%, preferably of less than 8% when heated at 200° C. for 5 minutes.

Heat-resistant molded foam articles 13 are typically in the shape of containers suitable for the packaging of food products like trays, bowls, cups, shallow plates and the like.

Packaging systems comprising a heat-resistant container closed by a flexible thermoplastic film to seal the product into the container are common in the field of the packaging of food products that require heating either in a microwave or in a conventional oven, i.e. in the field of dual ovenable packages.

In one of such systems the flexible thermoplastic film is sealed, typically heat-sealed, around the periphery of the heat-resistant container to provide a hermetic package. Generally in order to improve the shelf-life of the food product, the space between the product and the film is flushed with a different gas mixture with respect to the atmospheric one right before sealing the flexible film onto the container. In this application the flexible film may be either heat-shrinkable or not heat-shrinkable, either mono- or multi-layer. Flexible films of polyester, preferably polyethylene terephthalate, are particularly suitable for sealing onto polyester based containers. Typically the polyester flexible films are biaxially oriented for improved mechanical and/or thermal resistance.

Preferably the polyester flexible films are biaxially oriented heat-shrinkable films which comprise at least one sealing layer comprising an amorphous polyester, as for instance a copolyester of terephthalic acid, 1,4-cyclohexane dimethanol and ethylene glycol (PETG), and a bulk layer comprising polyethylene terephthalate. Flexible films suitable for this application have a thickness in the range of from 12 to 100 microns, from 15 to 60 microns.

This type of packaging can be obtained with currently available tray lidding machines, either automatic or manual, commercially supplied by, e.g., Ross Industries, Inc., Multivac, Inc. or Mondini S.p.A. Specific examples of suitable models include the Multivac® T550 or the Mondini Evoluzione Super. In this type of machines sealing of the flexible film onto the sealing surface of the container is carried out by means of a sealing frame, which forms a continuous seal around the perimeter of the container. Thus, a package is obtained comprising the heat-resistant molded foam article 13, a product loaded therein and a film of thermoplastic material placed over the product and the heat-resistant molded foam article wherein the film is sealed around the periphery of the heat-resistant molded foam article.

An alternative packaging system is the so-called "vacuum skin packaging" system, or "VSP". Vacuum skin packaging is described in many references, including FR 1,258,357, FR 1,286,018, U.S. Pat. No. 3,491,504, U.S. Pat. No. 3,574,642, U.S. Pat. No. 3,681,092, U.S. Pat. No. 3,713,849, U.S. Pat. No. 4,055,672, and U.S. Pat. No. 5,346,735. In a VSP process the article to be packaged serves as the mold for a flexible film. The food product is placed on the heat-resistant container, that can be flat or shaped, e.g. tray-shaped, bowl-shaped or cup-shaped, and the supported product is then passed to a chamber where the flexible film is drawn upward against a heated dome and the softened flexible film is then draped over the product. The movement of the film is controlled by vacuum and/or air pressure, and in a vacuum skin packaging arrangement, the interior of the container is vacuumized before final welding of the flexible film to the container. In a vacuum skin package the flexible film forms a tight skin around the product and is welded to the container. Thus, a package is obtained comprising the heat-resistant molded foam article 13, a product loaded therein and a film of thermoplastic material placed over the product and the heat-resistant molded foam article wherein the film is draped over the product and welded to the surface of the heat-resistant molded foam article 13 not covered by the product.

Multilayer films comprising a first outer heat-sealing layer capable of welding to the surface of the container, a gas barrier layer and a second outer heat-resistant layer are generally used as flexible films for VSP applications.

The outer heat-sealing layer may comprise any polymer capable of welding to the surface of the heat-resistant container. Suitable polymers for the heat-sealing layer may be ethylene homo- or co-polymers, like ethylene/alpha-olefin copolymers, ethylene/acrylic acid copolymers, ethylene/methacrylic acid copolymers, or ethylene/vinyl acetate copolymers, ionomers, co-polyesters.

The gas barrier layer typically comprises oxygen impermeable resins like ethylene/vinyl alcohol copolymers, polyamides and blends thereof.

Common polymers for the outer heat-resistant layers are for instance ethylene homopolymers, ethylene/cyclic-olefin copolymers, propylene homo- and co-polymers, ionomers, polyesters, polyamides.

The film may also comprise other layers such as adhesive layers, bulk layers and the like to provide the necessary thickness to the film and improve the mechanical properties thereof, i.e. increase puncture resistance, increase abuse resistance.

The flexible film is obtained by any suitable co-extrusion process, either through a flat or a round extrusion die, preferably by cast coextrusion or by hot blown. Preferably, for use as the flexible film in a VSP package the film is substantially non oriented. Typically the flexible film, or only one or more of the thermoplastic layers thereof, is cross-linked to e.g. improve the strength of the film and/or the heat resistance when the film is brought in contact with the heated dome during the packaging process. Cross-linking may be achieved by using chemical additives or by subjecting the film layers to an energetic radiation treatment, such as a high-energy electron beam treatment, to induce cross-linking between molecules of the irradiated material.

Films suitable for this application have a thickness in the range of from 50 to 200 microns, from 70 to 150 microns. Suitable flexible films for a VSP package are for instance those sold by Cryovac® under the trade name TH301®.

This type of packaging can be obtained with currently available machines, commercially supplied by, e.g., Mondini S.p.A. such as the Mondini E340 VG®.

Prior art equipment for manufacturing heat-resistant foamed polyester containers are characterised by long molding times and/or bulkiness. For instance, commercial thermoforming equipment are provided with a so-called "dual stage mold", i.e. a first set of heated molds for thermoforming the foamed polyester sheet and a second set of "heat-setting" molds for the thermal stabilisation and/or crystallisation of the molded product. Thus, it is not too practical to integrate the container molding process with the product packaging step. So far the two processes, i.e. manufacture of the heat-resistant polyester container and product packaging, have been typically carried out separately, usually at two different locations. However it would be very convenient to carry out the whole process in one step by supplying a low crystallinity foamed polyester sheet in roll-stock form to the product packaging facility: this would eliminate the need for the product packer to stock a number of different tray sizes and/or shapes and would also reduce the overall packaging costs by eliminating one manufacturing step.

A third object of the present invention is therefore a packaging process comprising the steps of heating a foamed polyester sheet of low crystallinity to a preforming temperature by contact with at least one heating plate; forming the heated foamed polyester sheet onto a non-heated mold; releasing the molded foamed polyester sheet from the mold; loading the product into the molded foamed polyester sheet; bringing a film of thermoplastic material over said product and said molded foamed polyester sheet; and sealing or welding said film of thermoplastic material onto said molded foamed polyester sheet.

Figure 2:
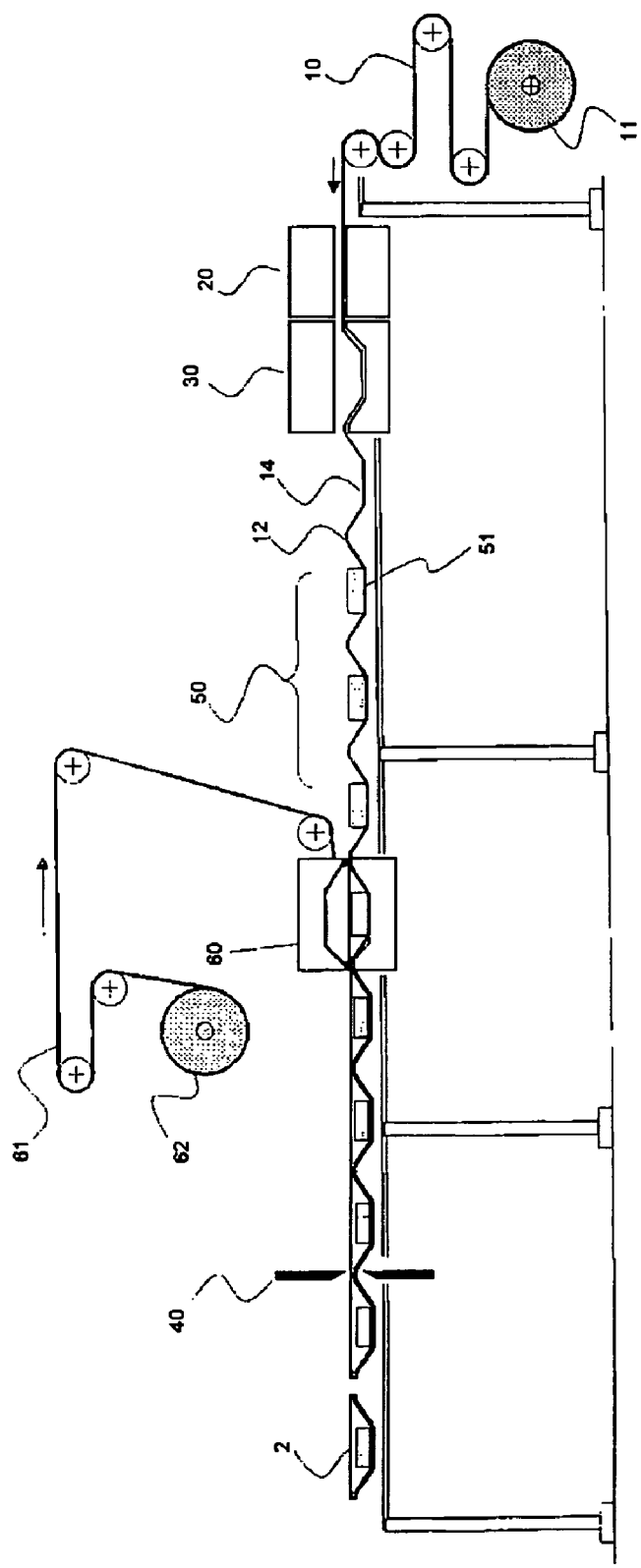
FIG. 2 is a schematic representation of a packaging process according to a first embodiment of the present invention.

A packaging process according to a first embodiment of the present invention is schematically shown in FIG. 2, where a process for making lidded containers is shown.

As disclosed in detail in connection with the molded foam product manufacturing process of FIG. 1, in the process shown in FIG. 2 a foamed polyester sheet 10 is fed from a roll of foam sheet 11 and advanced to a heating station 20. In the heating station 20, the sheet is heated to a preforming temperature by contact with at least one heating plate (not shown), which is at least 140° C., at least 150° C., at least 160° C., at least 170° C., at least 180° C., at least 190° C., at least 200° C. The preforming temperature is less than 255° C., less than 250° C. The preforming temperature is in the range of from 140 to 250° C., from 180 to 245° C., from 190 to 235° C., from 200 to 235° C.

In a subsequent step the heated sheet 10 is vacuum formed into the form of a cavity 14 in non-heated molding die 30. Molding die 30 is at a temperature which is lower than the preforming temperature of foamed polyester sheet 10. Molded foamed polyester sheet 12 is then advanced to a product loading station 50 wherein a product 51 is loaded into cavity 14 and subsequently advanced to a film sealing station 60. In sealing station 60 film 61, fed from a roll of flexible film 62, is positioned over molded cavity 14 and product 51 and sealed to the periphery of the molded cavity 14. Depending on the nature of the product to be packaged it may be desirable to modify the atmosphere inside cavity 14 before sealing film 61. The atmosphere can be modified either by simply flushing cavity 14 with product 51 loaded therein with a suitable gas or gas mixture or by firstly evacuating it and then back-filling with a suitable gas or gas mixture. The gas or the gas mixture are selected to maximize the shelf-life of the product being packaged. Preferred gases to replace evacuated air include oxygen, carbon dioxide, nitrogen, argon and mixtures thereof. Once this step has been completed, film 61 is then sealed around the periphery of cavity 14. Typically, sealing is carried out by means of a sealing frame which forms a continuous seal around the perimeter of the cavity 14. Sealing can be accomplished by any method known in the art, for instance by hot-bar, impulse, RF etc. In a first method cutting of package 2 from sheet 10 is accomplished immediately after sealing by means of a cutting frame (not shown) which encircles the sealing frame, or by means of heated knives. In an alternative method after sealing of film 61 onto cavity 14, molded sheet 12 is advanced to a cutting station 40.

If film 61 is a heat-shrinkable film, shrinkage of the film can be accomplished either during the sealing operations, due to the heat generated by the sealing frame or in a separate step, for instance by means of a heated shrinking tunnel positioned downstream of sealing station 60 or cutting station 40.

Figure 3:
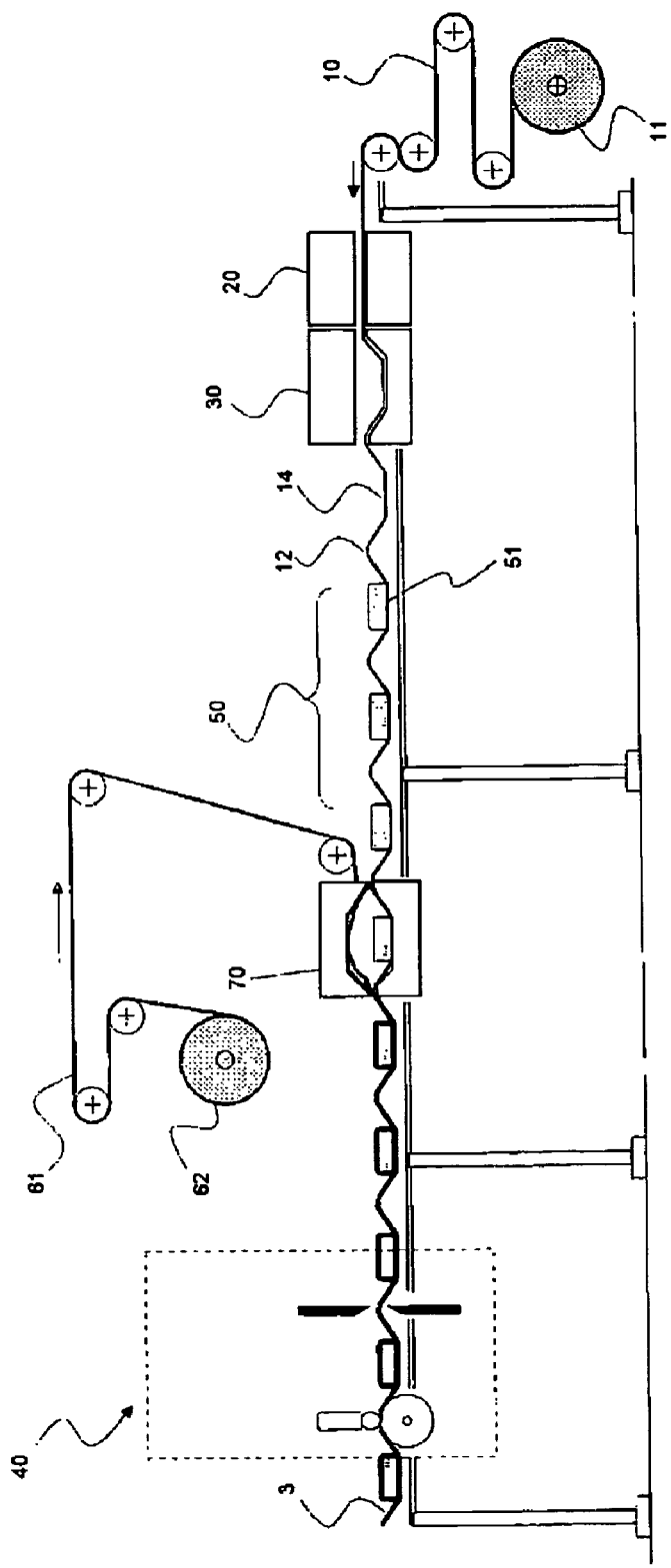
FIG. 3 is a schematic representation of a packaging process according to a second embodiment of the present invention.

A packaging process according to a second embodiment of the present invention is schematically shown in FIG. 3, where a process for making vacuum skin packages is shown.

In the process shown in FIG. 3 a foamed polyester sheet 10 is fed from a roll of foam sheet 11 and advanced to a heating station 20. In the heating station 20, the sheet is heated to a preforming temperature by contact with at least one heating plate (not shown), which is at least 140° C., at least 150° C., at least 160° C., at least 170° C., at least 180° C., at least 190° C., at least 200° C. The preforming temperature is less than 255° C., less than 250° C. The preforming temperature is in the range of from 140 to 250° C., from 180 to 245° C., from 190 to 235° C., from 200 to 245° C.

In a subsequent step the heated sheet 10 is vacuum formed into the form of a cavity 14 in non-heated molding die 30. Molding die 30 is at a temperature which is lower than the preforming temperature of foamed polyester sheet 10. Molded foamed polyester sheet 12 is then advanced to a product loading station 50 wherein product 51 is loaded into cavity 14 and subsequently advanced to a film forming station 70. In the film forming station 70 film 61 is placed over molded cavity 14 and product 51, it is heated and stretched upwardly away from the product, the area between flexible film 61 and cavity 14 is evacuated, then flexible film 61 is allowed to drape over product 51 and it is finally welded on the part of cavity 14 not covered by product 51. Film 61, softened by heating, is stretched against the dome of a vacuum skin packaging chamber by means of vacuum applied to the area between film 61 and said dome. Draping of film over and around product 51 is accomplished by releasing the vacuum pulling on flexible film 61. At the end of the packaging process flexible film 61 forms a tight skin around product 51, touching almost the whole surface of product 51 not in contact with cavity 14. Molded sheet 12 is then advanced to cutting station 40 wherein package 3 is separated from molded sheet 12.

The process according to the second embodiment of the invention may be performed on currently available Vacuum Skin Packaging (VSP) machines, like the Multivac R570CD® machine.

Typically the packaging processes are not limited to the production of just one package at a time, but multiple packages are usually produced at each cycle of the machine.

The present invention will be illustrated by some examples, however the present invention is not limited to these examples. The heat-resistant molded foamed polyester containers prepared in the following Examples were evaluated by the methods described below.

CRYSTALLINITY: The average crystallinity of the foamed polyester material was determined from the enthalpy of cold crystallisation and the enthalpy of fusion by using Differential Scanning Calorimetry.

DENSITY: was measured as the ratio between the weight and the volume of the foamed material as determined in water at 23° C.

HEAT RESISTANCE: The heat-resistance of foamed polyester molded products was determined in terms of distortion, calculated in each direction (longitudinal and transversal) according to the following relationship using the minimum and maximum lengths of the flange of an empty molded product having a rectangular shape which was held in a convection oven at 200° for 5 minutes.

$$\% \text{ Distortion} = \frac{\text{Maximun length} - \text{Minimum length}}{\text{Maximum length}} \times 100$$

EXAMPLE 1

A foamed polyethylene terephthalate resin sheet having a thickness of 1.2 mm, a density of 0.375 g/cm³ and an average crystallinity of about 9% coextruded with a 5 micron thick amorphous copolyester film was thermoformed into rectangular trays using a Multivac R570CD® standard machine according to the process of the present invention. The foamed polyester sheet preforming temperature, the molding time and the molded foamed tray properties are reported in Table 1.

TABLE 1

| Preforming Temperature (° C.) | Molding time (sec) | Molded foamed product | | |
|---|---|---|---|---|
| | | Density (g/cm³) | % Crystallinity | % Distortion (L, T) |
| 170 | 4 | — | >20 | −1.4, −4.4 |
| 200 | 7 | — | >20 | 1.8, 3.3 |

EXAMPLE 2

A foamed polyethylene terephthalate resin sheet having a thickness of 1.0 mm, a density of 0.370 g/cm³ and an average crystallinity of about 9% was thermoformed into rectangular trays using a Multivac R570CD® standard machine according to the process of the present invention. The foamed polyester sheet preforming temperature, the molding time and the molded foamed tray properties are reported in Table 2.

TABLE 2

| Preforming Temperature (° C.) | Molding time (sec) | Molded foamed product | | |
|---|---|---|---|---|
| | | Density (g/cm³) | % Crystallinity | % Distortion (L, T) |
| 140 | 3 | — | 29 | 4.1, 0.6 |
| 140 | 7 | — | 28 | 4.1, 1.8 |
| 160 | 3 | 0.260 | 27 | 3.4, 0 |
| 160 | 5 | 0.320 | 28 | 4.3, −0.6 |
| 160 | 7 | — | 26 | 4.0, −2.6 |
| 180 | 3 | — | 24 | 2.9, −0.6 |
| 180 | 5 | 0.270 | 22 | 3.8, 0 |
| 180 | 7 | — | 25 | 3.8, 0.6 |
| 200 | 3 | 0.320 | 24 | 3.3, 4.7 |
| 200 | 5 | 0.270 | 25 | 2.3, 1.2 |
| 200 | 7 | 0.290 | 25 | 2.3, 1.2 |

The average crystallinity of the molded foam articles was greater than 20% and the heat distortion resistance was below 5% in each direction in each of the samples.

The invention claimed is:

1. A packaging process comprising the steps of:
heating a foamed polyester sheet of low crystallinity to a preforming temperature to create a heated foamed polyester sheet;
forming the heated foamed polyester sheet onto a mold having a mold temperature that is less that the preforming temperature of the heated foamed polyester sheet to create a molded foamed polyester sheet having a crystallinity of at least 20%;
releasing the molded foamed polyester sheet from the mold;
loading a product into the molded foamed polyester sheet;
placing a film comprising thermoplastic material over the product and the molded foamed polyester sheet; and
sealing or welding the film comprising thermoplastic material onto the molded foamed polyester sheet.

2. The process according to claim 1 wherein the film comprising thermoplastic material is sealed around the periphery of the molded foamed polyester sheet.

3. The process according to claim 1 wherein the film comprising thermoplastic material is draped over the product and welded to the part of the molded foamed polyester sheet not covered by the product.

4. The process according to claim 1 which is an in-line process.

5. The process according to claim 1 wherein the preforming temperature is at least 140° C. and less than 255° C.

6. The process of claim 1 wherein the foamed polyester sheet of low crystallinity is bonded to a non-foamed film comprising amorphous copolyester.

7. The process according to claim 1 wherein the film comprising thermoplastic material is draped over the product and welded to the molded foamed polyester sheet around the product.

8. The process according to claim 1 wherein the heating step comprises contacting the foamed polyester sheet of low crystallinity with at least one heating plate to heat the foamed polyester sheet to the preforming temperature and create the heated foamed polyester sheet.

9. The process according to claim 1 wherein the molded foam polyester sheet is not heat set to increase the crystallinity subsequent to the releasing step.

10. The process according to claim 1 wherein the foamed polyester sheet of low crystallinity comprises ethylene units and, based on the dicarboxylate units, at least 50 mole % of terephthalate units.

* * * * *